US010644591B1

(12) United States Patent
Zhang (10) Patent No.: US 10,644,591 B1
(45) Date of Patent: May 5, 2020

(54) REGULATOR LIGHT LOAD CONTROL TECHNIQUES (71) Applicant: Linear Technology Holding LLC, Norwood, MA (US)

(72) Inventor: Bin Zhang, Grass Valley, CA (US)

(73) Assignee: Linear Technology Holding LLC, Norwood, MA (US)

( * ) Notice: Subject to any disclaimer, the term of this patent is extended or adjusted under 35 U.S.C. 154(b) by 0 days.

(21) Appl. No.: 16/161,683

(22) Filed: Oct. 16, 2018

(51) Int. Cl.
*H02M 3/156* (2006.01)
*H02M 1/00* (2006.01)
*H02M 1/08* (2006.01)

(52) U.S. Cl.
CPC .............. *H02M 3/156* (2013.01); *H02M 1/08* (2013.01); *H02M 2001/0025* (2013.01); *H02M 2001/0032* (2013.01); *H02M 2001/0035* (2013.01); *H02M 2003/1566* (2013.01)

(58) Field of Classification Search
CPC . H02M 2001/0032; H02M 2001/0035; H02M 3/156; H02M 2003/1566; H02M 3/158; H02M 1/08; H02M 2001/0025
See application file for complete search history.

(56) References Cited

U.S. PATENT DOCUMENTS

| 6,100,675 A * | 8/2000 | Sudo ................... H02M 3/156 323/282 |
| 6,828,766 B2 | 12/2004 | Corva et al. |
| 7,030,596 B1 | 4/2006 | Salerno et al. |
| 7,116,089 B1 | 10/2006 | Nguyen et al. |
| 7,180,274 B2 | 2/2007 | Chen et al. |
| 7,495,419 B1 | 2/2009 | Ju |
| 8,880,969 B2 | 11/2014 | Xi |
| 10,020,750 B2 | 7/2018 | Chen |
| 2003/0042879 A1 | 3/2003 | Huh et al. |
| 2006/0203814 A1 | 9/2006 | Ye et al. |
| 2007/0075694 A1 | 4/2007 | Xi et al. |

(Continued)

FOREIGN PATENT DOCUMENTS

| CN | 101588128 A | 11/2009 |
| CN | 104638924 A | 5/2015 |
| CN | 204721209 U | 10/2015 |

OTHER PUBLICATIONS

Keeping, Steven, "The Role of Slope Compensation in Current-Mode-Controlled Voltage Regulators", Electronic Products; Jan. 20, 2015.

(Continued)

*Primary Examiner* — Alex Torres-Rivera
(74) *Attorney, Agent, or Firm* — Schwegman Lundberg & Woessner, P.A.

(57) ABSTRACT

Techniques for operating a power supply under light load conditions are provided. In an example, a frequency of an oscillator can be adjusted based on a feedback signal indicative of a voltage error of the power supply when the feedback signal falls below a first threshold. In certain examples, a peak inductor current command can be kept constant and a slope compensation ramp can be based on the frequency of the oscillator when the feedback signal falls below the first threshold. In some examples, various circuits of the power supply can be disabled when the feedback signal further falls below a second threshold. The feedback signal can be indicative of a load on the power supply.

20 Claims, 7 Drawing Sheets

(56) References Cited

U.S. PATENT DOCUMENTS

| | | | |
|---|---|---|---|
| 2007/0210772 A1 | 9/2007 | Sawtell | |
| 2008/0175029 A1* | 7/2008 | Jung | H02M 3/156 363/79 |
| 2009/0079383 A1 | 3/2009 | Fornage et al. | |
| 2009/0153124 A1 | 6/2009 | Ishii | |
| 2009/0302820 A1 | 12/2009 | Shimizu et al. | |
| 2010/0102785 A1* | 4/2010 | Young | H02M 3/156 323/234 |
| 2012/0091981 A1* | 4/2012 | Komiya | H02M 3/156 323/282 |
| 2013/0173980 A1* | 7/2013 | Xi | H02M 3/156 714/746 |
| 2014/0016362 A1 | 1/2014 | Adragna et al. | |
| 2014/0375286 A1 | 12/2014 | Jiang et al. | |
| 2015/0194880 A1* | 7/2015 | Wibben | H02M 3/156 323/282 |
| 2015/0263614 A1* | 9/2015 | Bansal | G01R 19/2506 323/282 |
| 2016/0006336 A1* | 1/2016 | Bennett | H02M 1/00 323/271 |
| 2016/0049859 A1 | 2/2016 | De Cremoux et al. | |
| 2016/0056719 A1* | 2/2016 | Teh | H02M 3/157 323/283 |
| 2018/0054134 A1 | 2/2018 | Moon et al. | |
| 2019/0238054 A1* | 8/2019 | Flaibani | H03K 7/06 |

OTHER PUBLICATIONS

Li, Hui, "AN084: Switching Mode Power Supply Design with 900V Switching Regulator—MP110", Monolithic Power (MPS) Application Note, (Jun. 2014), 45 pgs.

Linear Technology, "1.5MHz Synchronous Dual Channel DC/DC Converter and 100mA LDO", Linear Technology Corp. Data Sheet, (2008), 26 pgs.

Linear Technology, "LTC1779: 250mA Current Mode Step-Down DC/DC Converter in ThinSOT", Linear Technology Corp. Data Sheet, (2000), 14 pgs.

Linear Technology, "LTC1871-7: High Input Voltage, Current Mode Boost, Flyback and SEPIC Controller", Linear Technology Corp. Data Sheet, (2002), 34 pgs.

Linear Technology, "LTC1872: Constant Frequency Current Mode Step-Up DC/DC Controller in SOT-23", Linear Technology Corp. Data Sheet, (2000), 15 pgs.

Linear Technology, "LTC3101: Wide VIN, Multi-Output DC/DC Converter and PowerPath Controller", Linear Technology Corp. Data Sheet, (2008), 34 pgs.

Linear Technology, "LTC3104: 2.6µA Quiescent Current, 15V, 300mA Synchronous Step-Down DC/DC Converter and 10mA LDO", Linear Technology Corp. Data Sheet, (2011), 22 pgs.

Linear Technology, "LTC3402: 2A, 3MHz Micropower Synchronous Boost Converter", Linear Technology Corp. Data Sheet, (2000), 16 pgs.

Linear Technology, "LTC3414: 4A, 4MHz, Monolithic Synchronous Step-Down Regulator", Linear Technology Corp. Data Sheet, (2003), 17 pgs.

Linear Technology, "LTC3520: Synchronous 1A Buck-Boost and 600mA Buck Converters", Linear Technology Corp. Data Sheet, (2007), 24 pgs.

Linear Technology, "LTC3521: 1A Buck-Boost DC/DC and Dual 600mA Buck DC/DC Converters", Linear Technology Corp. Data Sheet, (2010), 22 pgs.

Linear Technology, "LTC3522: Synchronous 400mA Buck-Boost and 200mA Buck Converters", Linear Technology Corp. Data Sheet, (2007), 20 pgs.

Linear Technology, "LTC3549: 250mA Low VIN Buck Regulator in 2mm×3mm DFN", Linear Technology Corp. Data Sheet, (2005), 16 pgs.

Linear Technology, "LTC3602: 2.5A, 10V, Monolithic Synchronous Step-Down Regulator", Linear Technology Corp. Data Sheet, (2008), 20 pgs.

"European Application Serial No. 19202414.9, Extended European Search Report dated Mar. 13, 2020", 9 pgs.

Liu, Yuxin, et al., "Design of a switching frequency adaptive slope compensation circuit for frequency synchronous Dc-Dc conver", Microelectronics Journal, Mackintosh Publications Ltd. Luton, GB, vol. 44, No. 4, (Dec. 25, 2012), 339-346.

\* cited by examiner

ABSTRACT# REGULATOR LIGHT LOAD CONTROL TECHNIQUES

TECHNICAL FIELD

The present disclosure discusses switching regulators and power supplies, and more particularly, control techniques for traversing into and out of light load operation.

BACKGROUND

Conventional DC/DC switching mode power supplies provide "burst mode" control to achieve low quiescent current at light load. At light load, the burst mode control can reduce quiescent current by forcing inductor peak current to a designed value, frequently turning off much of the internal circuitry, putting the system into sleep. While many burst mode control technologies have demonstrated the input quiescent current reduction capabilities, they also have some undesirable characteristics at different conditions such as high output voltage ripple. Some burst mode techniques can avoid high output voltage ripple but incur undesirable subharmonic oscillation in the inductor current at high duty-cycle and continuous inductor current conditions. Such instability can be avoided using smaller inductors, however, such a solution is less efficient at most power levels and will have higher burst mode quiescent current at light load conditions

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
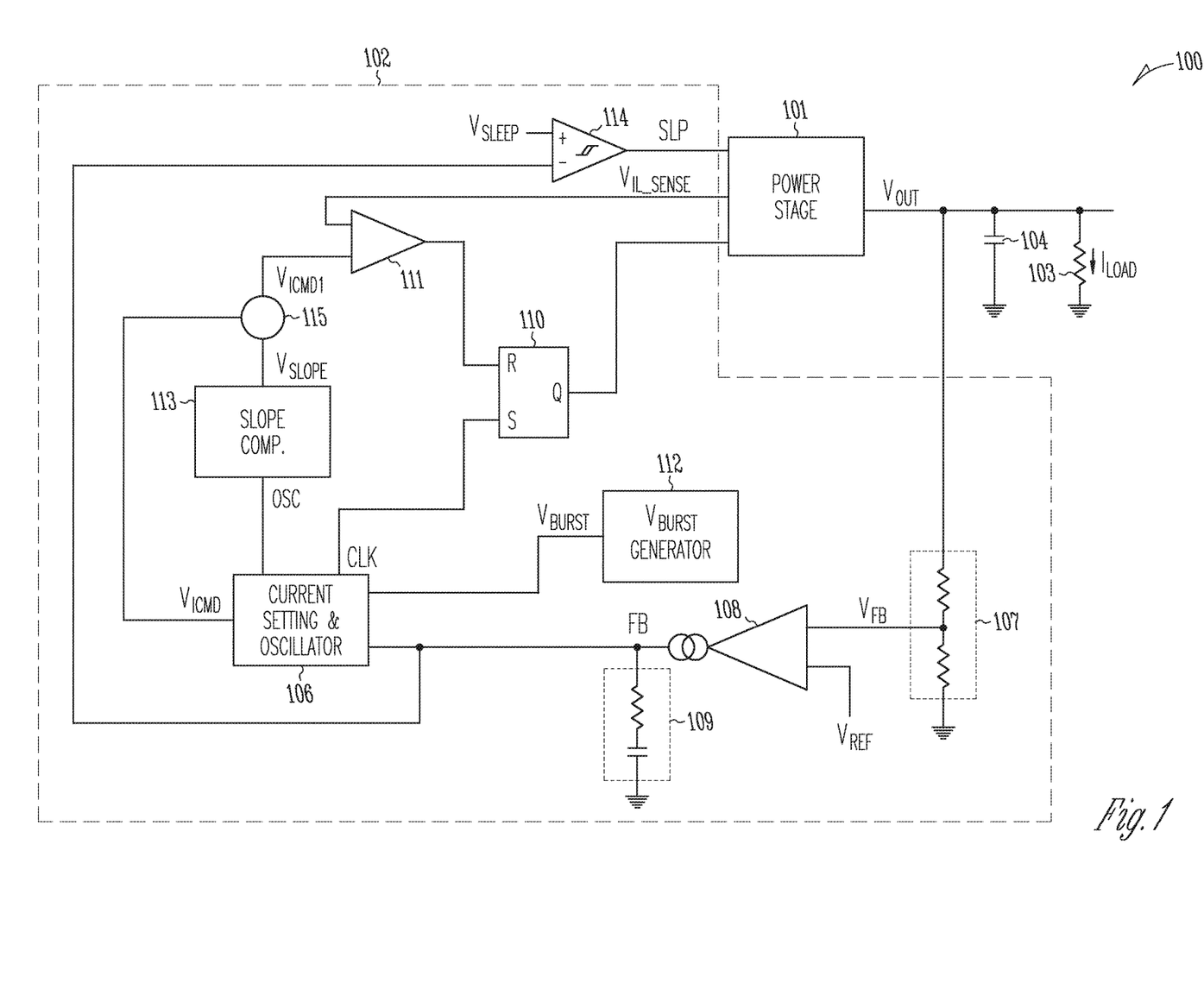
FIG. 1 illustrates generally an example DC-DC switching mode power supply, or switching regulator, circuit for supplying power to a load.

FIG. 1 illustrates generally an example DC-DC switching mode power supply, or switching regulator, circuit 100 for supplying power to a load. The circuit 100 can include a power stage 101, and control circuitry 102. The power stage can receive a supply voltage ($V_{IN}$) and provide a regulated output voltage ($V_{OUT}$). In some examples, the power stage 101 can include a switched inductor (not shown) for initi-ating inductor current and dumping at least a portion of the current to the load 103. In certain examples, the power stage 101 can include an output capacitor 104 to smooth the output voltage (Vout) of the power stage 101.

In certain examples, the control circuitry 102 can include a current setting and oscillator circuit 106 to initiate switching cycles of the power stage 101 and to set a duty cycle of the switching cycle to regulate the output voltage (Vout) to a desired voltage. In certain examples, a feedback signal (FB) can provide a representation of a voltage difference or error between the output voltage (Vout) and the desired voltage. In some examples, a feedback circuit can include a voltage divider 107, a first reference voltage ($V_{REF1}$) and an error amplifier 108. The voltage divider 107 can provide a representation ($V_{FB}$) of the output voltage ($V_{OUT}$). The first reference voltage can provide a representation of the desired output voltage. The error amplifier 108 can compare the representation ($V_{FB}$) of the output voltage (VOUT) and the representation of the desired output voltage, the first reference voltage ($V_{REF1}$), and can provide the feedback signal (FB) indicative of the difference between the representation (Vfb) of the output voltage (Vout) and the representation of the desired output voltage ($V_{REF1}$). In certain examples, the error amplifier 108 can be a transconductance amplifier providing a current signal indicative of the difference between the representation (Vfb) of the output voltage (Vout) and the representation of the desired output voltage ($V_{REF1}$). In some examples, the feedback circuit can include a capacitor, or resistor-capacitor network 109 for scaling and integrating the output of the amplifier 108 such that the feedback signal (FB) is a representation of the voltage error that includes a scaled, or proportional component, and an integral component.

In certain examples, the control circuitry 102 can include a flip-flop 110 and a peak current comparator 111. The peak current comparator 111 can receive a feedback signal ($V_{IL\_SENSE}$) indicative of inductor current of the power stage 103 and a peak current threshold ($V_{ICMD1}$) indicative of a peak current threshold generated at the current setting and oscillator circuit 106. A clock signal (CLK) of the current setting and oscillator circuit 106 received at an input of the flip-flop 110 can initiate a first state of a switching cycle of the power stage 103, thus initiating inductor current of the switched inductor. As the inductor current, via the inductor current feedback signal ($V_{IL\_SENSE}$), satisfies the peak current threshold ($V_{ICMD1}$), the output of the peak current comparator 111 can reset the output of the flip-flop 110 to begin a second stage of the switch cycle of the power stage 103. In certain examples, during periods of high duty cycle, the length of the second stage of the switch cycle can be very small.

Figure 3A:
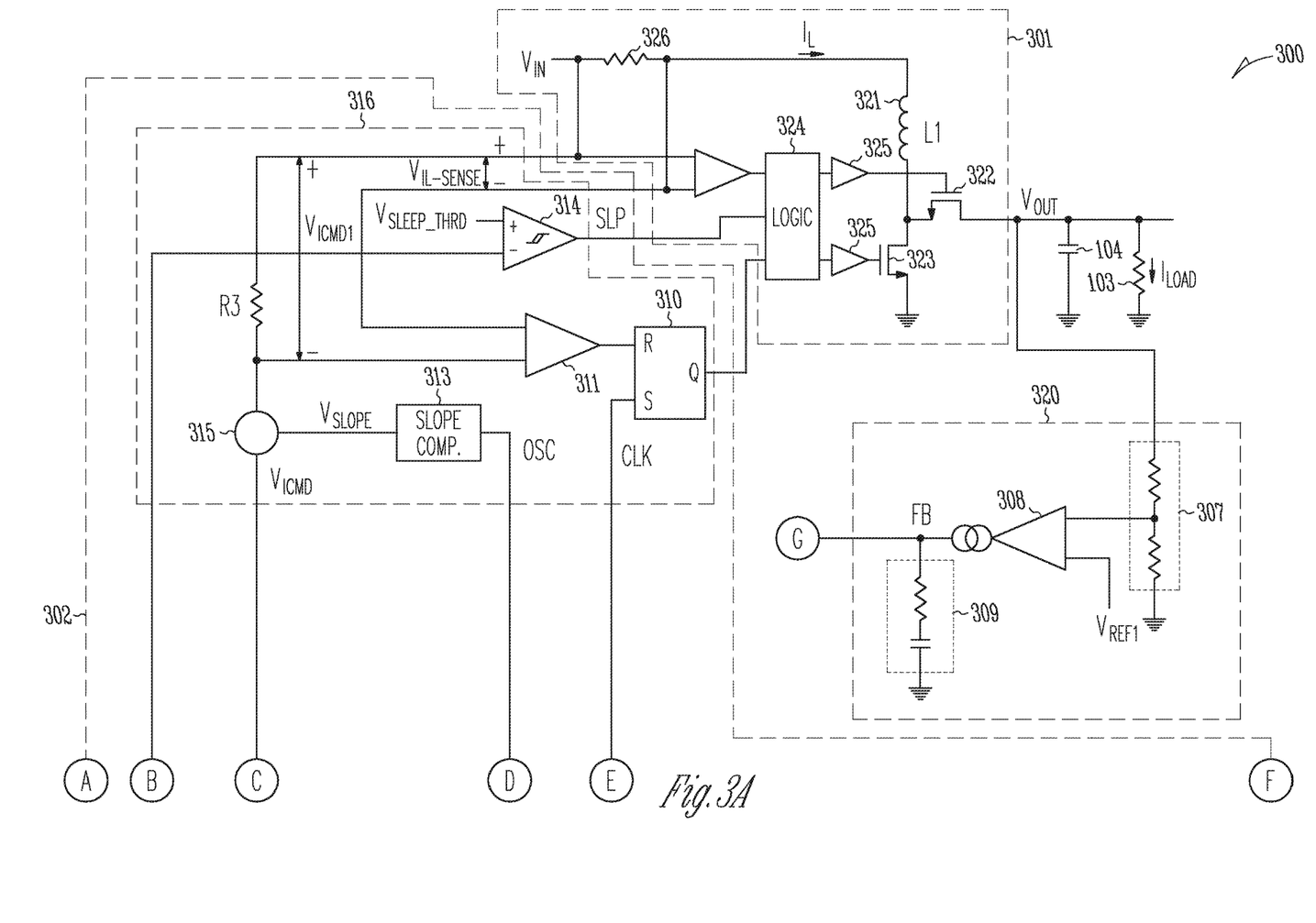
FIGS. 3A and 3B illustrate generally a detail view of an example DC-DC switching mode power supply circuit according to the present subject matter. The DC-DC
Figure 3B:
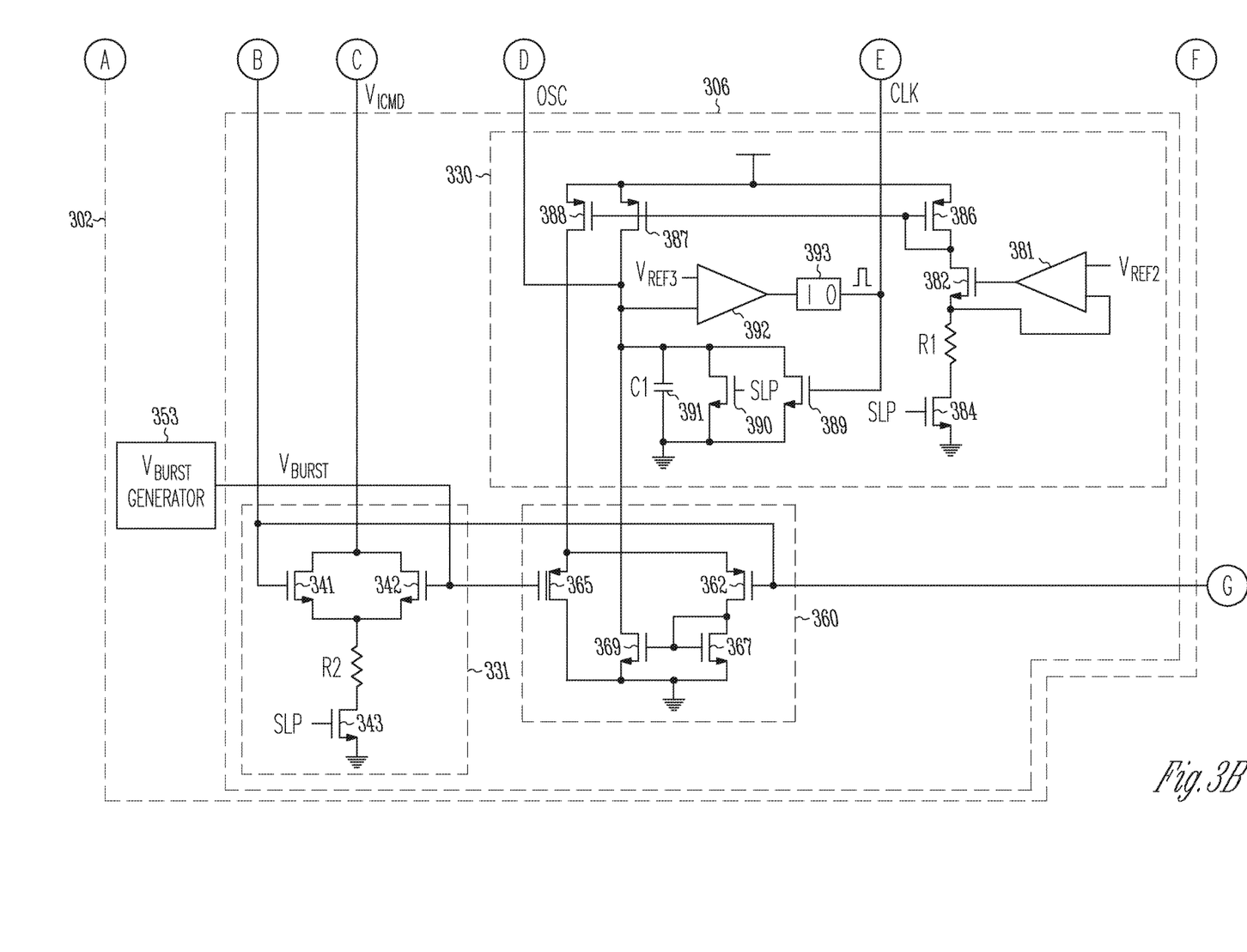

In certain examples, a slope compensation circuit 113 can generate a slope compensation signal ($V_{SLOPE}$) based on an oscillator ramp signal (OSC) and can be summed with peak current command signal ($V_{ICMD}$) to stabilize the current control. The slope compensation signal ($V_{SLOPE}$) can be summed with the peak current command signal ($V_{ICMD}$) to provide the peak current threshold ($V_{ICMD1}$). In alternative examples, the slope compensation signal ($V_{SLOPE}$) can be summed with inductor current feedback signal ($V_{IL\_SENSE}$) to form a combined signal, and the combined signal can be compared at the peak current comparator 111. FIGS. 1 and 3A/3B illustrate voltage signals being summed at the summing node 115, 315. It is understood that other signal types, such as, but not limited to, current signals can be summed at the summing node 115, 315 without departing from the present subject matter.

In certain examples, the control circuitry 102 can include a second reference generator 112 for generating a second threshold ($V_{BURST}$). The second threshold ($V_{BURST}$) can represent when the DC-DC switching mode power supply circuit 100 is under "light load" conditions. For conventional architectures, such conditions can place the power supply circuit in a burst switching mode where the oscillator or clock signal are intermittently disable such that the average switching frequency appears to decrease. In certain examples of the present subject matter, the second reference ($V_{BURST}$) can compared to the feedback signal (FB). When the feedback signal (FB) falls below the second reference ($V_{BURST}$), the current setting and oscillator circuit 106 can maintain a peak current command ($V_{ICMD}$) at a constant level and can begin to reduce the actual frequency of the oscillator based on the feedback signal (FB). The reduction in oscillator frequency can reduce the switching frequency and can result in less power supplied to the load. In certain examples, in addition to reducing the oscillator frequency, the control circuit 102 can include a slope compensation ramp circuit 113 that can provide a slope compensation ramp signal ($V_{SLOPE}$) that is responsive to the oscillator frequency ($f_{OSC}$) via an oscillator ramp signal (OSC) provided by the current setting and oscillator circuit 106. The slope compensation ramp signal ($V_{SLOPE}$) can be summed with the current command signal ($V_{ICMD}$) at a summer 115, or summer node, to provide the peak current threshold ($V_{ICMD1}$). During light load operation, the frequency-responsive slope compensation signal ($V_{SLOPE}$) can allow the actual peak inductor current to remain constant or nearly constant resulting in stabilize closed loop control of inductor current during "light load" and continuous inductor current conditions. In certain examples, when the feedback signal is above the second threshold ($V_{BURST}$), the current setting and oscillator circuit 106 can maintain a constant switching frequency ($f_{OSC}$) and can base the peak current command ($V_{ICMD}$) on the feedback signal (FB).

In certain examples, the control circuit 102 can receive or can generate a third threshold, a sleep threshold ($V_{SLEEP}$). Should the load of the DC-DC switching mode power supply circuit 100 become even lighter, such that the feedback signal (FB), the integrated and scaled voltage error signal, falls below the third threshold ($V_{SLEEP}$), a sleep comparator 114 can disable the power stage 103. In certain examples, the output of the sleep comparator 114 can be used elsewhere in the control circuitry 102 to further disable power usage when the load conditions of the DC-DC switching mode power supply circuit 100 are extremely light. Such power savings can significantly reduce quiescent current, as well as power, of the system including the DC-DC switching mode power supply circuit 100.

Figure 2:
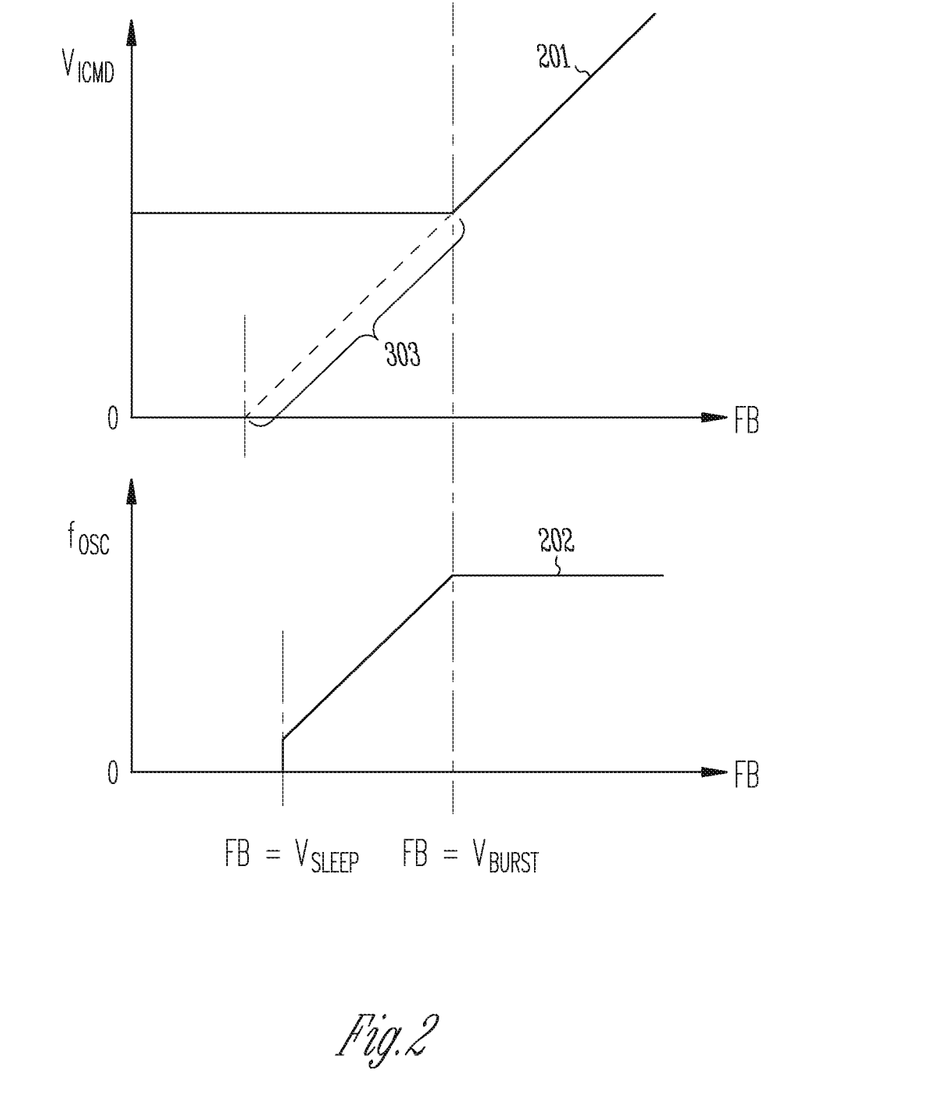
FIG. 2 illustrates graphically certain conditions of the DC-DC switching mode power supply circuit of FIG. 1 as the load on the DC-DC switching mode power supply circuit changes.

FIG. 2 illustrates graphically certain conditions of the DC-DC switching mode power supply circuit 100 of FIG. 1 as the load on the DC-DC switching mode power supply circuit 100 lightens. FIG. 2 illustrates the peak current command 201 ($V_{ICMD}$) and the oscillator frequency 202 ($F_{OSC}$) as a function of the feedback signal (FB) of the DC-DC switching mode power supply circuit 100 of FIG. 1. In general, as the load on the DC-DC switching mode power supply circuit 100 varies, the feedback signal (FB), the integrated and scaled version of the voltage error, falls or lessens in value. In conventional power supplies, the switching frequency is fixed and the peak current, either commanded or actual, can becomes less as less current is required to maintain the output voltage (Vout). In certain examples of the present subject matter, as the feedback signal (FB) falls below the second threshold ($V_{BURST}$), the actual frequency ($f_{OSC}$) of the oscillator can be reduce as a function of the feedback signal (FB) and the peak current command 201 ($V_{ICMD}$) can be held constant. As the oscillator frequency ($f_{OSC}$) is reduced, the slope compensation ramp ($V_{SLOPE}$) an also be modified based on the oscillator ramp signal (OSC). Some conventional techniques attempt to maintain current close loop balance during light load conditions by inserting delay intervals between a burst of clock cycles or each clock cycle, but still operating the oscillator at the same frequency and maintaining the same slope compensation. Such conventional techniques during light load conditions can lead to large output voltage ripple and chaotic switching waveforms at high duty cycle and continuous inductor current operation. As used herein, when a reduction of clock frequency is discussed with respect to the present subject matter, the actual frequency of the oscillator is reduced.

FIG. 2 also illustrates that when the current load lightens further and the feedback signal (FB) falls below a third threshold ($V_{SLEEP}$), the oscillator can be disabled and quiescent current of the DC-DC switching mode power supply circuit can become very small. The combination of the reduced oscillator frequency ($f_{OSC}$) and the adapted or modified slope compensation ramp signal ($V_{SLOPE}$), while maintaining a constant peak current command ($V_{ICMD}$) can allow the DC-DC switching mode power supply circuit to maintain stable control of the inductor current to provide regulated, low-ripple, output voltage during a wide range of "light load" conditions, such as high duty-cycle and continuous inductor current "light load" conditions.

FIGS. 3A and 3B illustrate generally a detail view of an example DC-DC switching mode power supply circuit 300 according to the present subject matter. The DC-DC switching mode power supply circuit can provide regulated voltage ($V_{OUT}$) to a load 103 and an optional output capacitor 104 in various examples. In certain examples, DC-DC switching mode power supply circuit can include a power stage 301, a feedback circuit 320, and a control circuit 302. The power stage 301 can include a switched inductor power stage that can include an inductor 321, a first power switch 322, a second power switch 323, power control logic 324 and drivers 325, and a current sense circuit 326. It is understood that the illustrated power stage 301 is just one example and that other power stage configurations, such as, but not limited to, an inductive switching circuit, are possible without departing form the scope of the present subject matter.

The feedback circuit 320 can include a voltage divider 307, an amplifier 308 and a compensation circuit 309. The voltage divider 307 can provide a representation ($V_{FB}$), or scaled version, of the output voltage ($V_{OUT}$) of the DC-DC switching mode power supply circuit 300. In certain examples, the amplifier 308 can provide an error signal in response to a comparison of the representation ($V_{FB}$) of the output voltage ($V_{OUT}$) of the DC-DC switching mode power supply circuit 300 and a reference ($V_{REF1}$) indicative of a desired output voltage. In certain examples, the reference ($V_{REF1}$) can be variable to allow the output voltage ($V_{OUT}$) of the DC-DC switching mode power supply circuit 300 to be adjustable. In certain example, the amplifier 308 can be a transconductance amplifier and an output current of the amplifier 308 can represent the error between the representation ($V_{FB}$) of the output voltage ($V_{OUT}$) of the DC-DC switching mode power supply circuit 300 and the reference ($V_{REF1}$) indicative of a desired output voltage. The compensation circuit 309 can include a capacitor or a resistor capacitor network. The compensation circuit 309 can adjust the error signal to provide a feedback signal (FB) including a scaled and integral representation of the voltage error signal.

The control circuit 302 can include a peak current comparator circuit 316, and a current setting circuit and oscillator circuit 306. The peak current comparator circuit 316 can include a peak current comparator 311, summing circuit 315 or summing node, a flip-flop 310, and a slope compensation circuit 313. The peak current comparator 311 can receive an indication ($V_{IL\_SENSE}$) of actual inductor current from the power stage 301 and a peak current threshold ($V_{ICMD1}$) from the summing circuit 315. Based on the comparison of the indication ($V_{IL\_SENSE}$) of actual current and the peak current threshold ($V_{ICMD1}$), the peak current comparator 311 can provide a signal to reset an output of the flip-flop 310. The output of the flip-flop 310 can be set on an edge of the clock signal (CLK) received from an oscillator circuit 330 of the current setting circuit and oscillator circuit 306.

The summing node 315 can receive a current command from a current setting circuit 331 of the current setting circuit and oscillator circuit 306 and an output from the slope compensation circuit 313. When the DC-DC switching mode power supply circuit 300 is under moderate and heavy loads, the slope compensation circuit 313 can modify an oscillator ramp signal (OSC) to assist the DC-DC switching mode power supply circuit 300 in maintaining stability at various duty cycles. In certain examples, the slope compensation ramp signal ($V_{SLOPE}$) of the slope compensation circuit 313 can modify a current command signal ($V_{ICMD}$) to provide the peak current threshold ($V_{ICMD1}$) as the value of the oscillator ramp signal changes.

The current setting circuit 331 can include a current command circuit including a first transistor 341, a second transistor 342, a third transistor 343 and a resistor (R2). The first transistor 341 can be responsive to the feedback signal (FB) and the second transistor 342 can be responsive to a "light load" threshold ($V_{BURST}$). For conventional circuits, the "light load" threshold ($V_{BURST}$) can represent a threshold used to define a transition into a "burst" switching mode of operation. When the feedback signal (FB) is higher than the "light load" threshold ($V_{BURST}$), the second transistor 342 can be "off", or in a high impedance state, and the current command signal ($V_{ICMD}$) can be responsive to the state of the first transistor 341 and the feedback signal (FB). In the illustrated example using NMOS transistors, the current command signal ($V_{ICMD}$) can be defined by the feedback signal (FB) minus the gate to source voltage (VGS) of the first transistor 341 applied on the resistor (R2), thus the current command signal can be given by, $$V_{ICMD}=R3/R2 \cdot (FB-V_{GS}).$$

When the feedback signal (FB) is lower than the "light load" threshold ($V_{BURST}$), the first transistor 341 can be "off" and the output current command signal ($V_{ICMD}$) can be given by the "light load" threshold ($V_{BURST}$) minus the gate to source voltage ($V_{GS}$) of the second transistor 342 applied on the resistor (R2). In addition, when the feedback signal (FB) is lower than the "light load" threshold ($V_{BURST}$), the DC-DC switching mode power supply circuit 300 can enter a "burst mode" or a "light load" mode of operation. In "burst mode", the current command signal ($V_{ICMD}$) can be clamped via the "light load" threshold ($V_{BURST}$) to a "burst mode" level ($V_{ICMD\_BURST}$). In certain examples, the first and second transistor pair 341, 342 can have a large W/L ratio such that the high gain results in a sharp hand over between the operating modes. In certain examples, the "burst mode" level ($V_{ICMD\_BURST}$) can be given by, $$V_{ICMD\_BURST}=R3/R2 \cdot (V_{BURST}-V_{GS}).$$

In certain examples, the oscillator circuit 330 can include a current source circuit, a charge capacitor circuit 389, 391, 390 an oscillator comparator 392, and pulse generator 393. In operation, the current source circuit charges the charge capacitor circuit using a current based on a first oscillator reference ($V_{REF2}$). When the charge capacitor circuit charges to a second oscillator threshold ($V_{REF3}$), an output of the oscillator comparator 392 can change states triggering the pulse generator 393 to provide a clock pulse. The clock pulse can be used to set the output of the flip-flop 310 of the peak current comparator circuit 316. The clock pulse can further trigger a discharge transistor 389 of the oscillator circuit 330 to discharge the charge capacitor circuit and the cycle can repeat.

In certain examples, the current source circuit can include a voltage follower amplifier 381 and corresponding output transistor 382, a current mirror 386, 387, 388, and a charge current control circuit 360. The current source can provide a sense voltage for the current mirror. The sense current of the current mirror 386, 387, 388 can be based on the first oscillator reference ($V_{REF2}$). In certain examples, the current mirror 386, 387, 388 can include a first mirror transistor 387 for setting the charge current level of the oscillator charge capacitor circuit 389, 390, 391. In certain examples, the first mirror transistor 387 can provide current amplification via gate width ratio with the sense transistor 386.

The charge capacitor circuit 360 can include an oscillator capacitor 391 and the discharge transistor 389. The oscillator capacitor 391 can receive the current provided by the first mirror transistor 387 to establish an oscillator charge voltage, oscillator ramp signal (OSC). The oscillator ramp signal (OSC) can be receive at an input of the oscillator comparator 392 for comparison to the second oscillator reference ($V_{REF3}$). In certain examples, the charge capacitor circuit can include a sleep transistor 390 to discharge the oscillator capacitor 391 during a sleep mode of the DC-DC switching mode power supply circuit 300.

The charge current control circuit 360 can include a pair of comparator transistors 362, 365, and a current mirror 367, 369. A first transistor 362 of the pair of comparator transistors can be responsive to the feedback signal (FB) and the second transistor 365 of the pair of comparator transistors can be responsive to the "light load" threshold ($V_{BURST}$). In certain examples, the pair of comparator transistors 362, 365 can have a small W/L ratio to provide a soft handover as the feedback signal (FB) traverses the value of the "light load" threshold ($V_{BURST}$). In certain examples, different PMOS type for the pair of comparator transistors 362, 365 can be chosen to make the threshold voltage of a first comparator transistor 365 lower than that of a second comparator 362, so that as the feedback signal (FB) decreases, the peak current command ($V_{ICMD}$) being clamped to a constant value (e.g., FIG. 4B, $I_{CMD\_BURST}$) can happen simultaneously as the oscillator frequency ($f_{OSC}$) starts to decrease, as shown in FIG. 2.

When the feedback signal (FB) is much higher than the "light load" threshold ($V_{BURST}$), first transistor 362 can be "off" (PMOS), the second transistor 365 can be "on", and the current mirror 367, 369 does not sink current. The current of a second mirror transistor 388 of the charge current control circuit can be conducted to ground (GND). In addition, the oscillator's switching frequency is constant. As the feedback signal (FB) decreases and approaches the "light load"

threshold ($V_{BURST}$), the first transistor 362 can gradually turn "on" and can start to divert current from the second transistor 365. As the current mirror, 567 and 569, begins to turn "on", current can be gradually diverted from the OSC node. As a result, the charge current for the charge capacitor 391 can be gradually reduced and, in turn, the oscillator frequency ($f_{OSC}$) can be gradually reduced. The ratio between the first and second mirror transistors 587, 588 of the charge current control circuit can define the reduction ratio of the charge current of the charge capacitor 391, and therefore, the oscillator frequency reduction ratio.

In certain examples, the combination of the modified oscillator frequency ($f_{OSC}$) and the corresponding modification of the slope compensation ramp ($V_{SLOPE}$) can allow better closed loop current regulation of the DC-DC switching mode power supply circuit 300 during a wide range of "light load" conditions, such as high duty-cycle and continuous inductor current "light load" conditions.

In certain examples, and as touched upon above, if the feedback signal (FB) falls below a sleep threshold ($V_{SLEEP}$), a sleep comparator 314 can generate a sleep command signal (SLP). In certain examples, the sleep command signal (SLP) can be received by logic 324 of the power stage 301 to disable switching of the power transistors 322, 323. In some examples, a sleep transistor 343 of the current setting circuit 331 can disable generation of the current command signal ($V_{ICMD}$), further ensuring a sleep state of the DC-DC switching mode power supply circuit 300. In certain examples, a sleep transistor 384 of the charge current source can be responsive to the sleep command (SLP) and can enable and disable the charge current source. In certain examples, a sleep transistor 390 of the charge capacitor circuit can be responsive to the sleep command (SLP) and can enable and disable charging of the oscillator capacitor 391. Employment of one or more of the circuits responsive to the sleep command (SLP) can provide a very low quiescent state of the DC-DC switching mode power supply circuit 300 when the current load is very light.

FIGS. 3A and 3B illustrate one example of a circuit according to the present subject matter and includes transistors of various types (e.g., BJT, MOS, CMOS, n-channel, p-channel, etc.). It is understood that in other examples, the transistors can be of a different configuration than that shown without departing from the scope of the present subject matter.

Figure 4A:
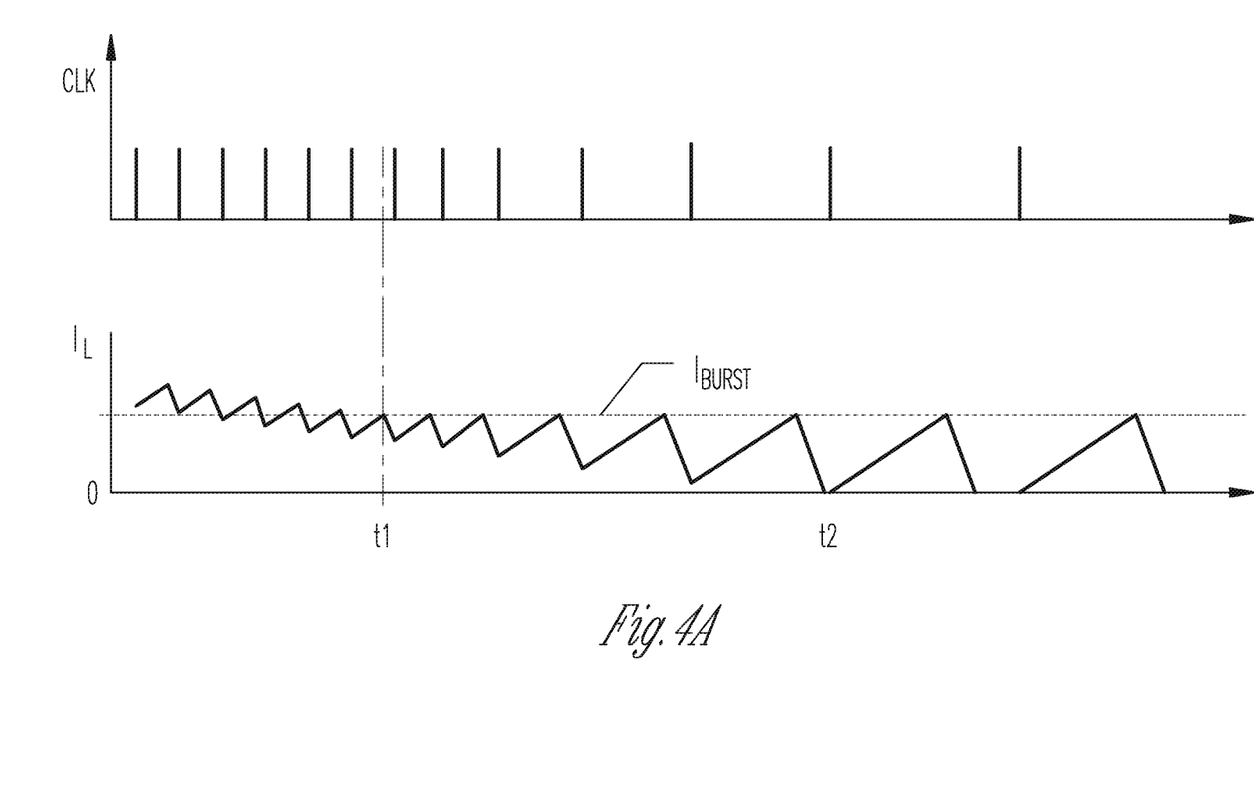
FIG. 4A illustrates generally the inductor current (IL) as a function of time as the DC-DC switching mode power supply circuit according to present subject matter traverses to a "light load" mode of operation.

FIG. 4A illustrates generally a simplified version of the inductor current (IL) as a function of time as the DC-DC switching mode power supply circuit according to present subject matter traverses to a "light load" mode of operation. Before t1, the DC-DC switching mode power supply circuit 300 is switching a constant frequency even though the average current load, as well as, the peak inductor current, are trending down. At t1, the feedback signal (FB) falls below the "light load" threshold ($V_{BURST}$). In turn, via a reduction in the frequency of the oscillator ($f_{OSC}$), corresponding change to the slope compensation ramp, constant peak current command ($I_{CMD}$ or $V_{ICMD}$), and corresponding modification of the peak current threshold ($I_{CMD1}$ or $V_{ICMD1}$), the actual peak inductor current (L) for an associated duty cycle can also become constant ($I_{BURST}$). At t2, the oscillator frequency ($f_{OSC}$) has slowed considerably compared to the oscillator frequency ($f_{OSC}$) at or before t1 and the DC-DC switching mode power supply circuit 300 can begin to operate in a discontinuous current mode. Unlike conventional systems, the transition to a "light load" mode of operation, and during the "light load" mode of operation, the current control of the DC-DC switching mode power supply circuit can remain stable. In certain examples, the stability can be maintained by changing the actual frequency ($f_{OSC}$) of the oscillator, not adding idle mode delays or delay intervals as is done in conventional systems or switching the oscillator on for bursts of cycles. In addition to changing the actual frequency the oscillator operates at, the peak current command threshold can be modified by adjusting a slope compensation ramp with the oscillator frequency ramp such that for the lower frequencies of the oscillator during "light load" conditions, the slope compensation ramp can be extended with the period of the oscillator. In certain examples, under "light load" conditions, the adjusted slope compensation ramp can result in a nearly constant actual peak inductor current. It is understood that a mirror image of FIG. 4A illustrates generally the inductor current (IL) as a function of time as the DC-DC switching mode power supply circuit according to present subject matter traverses from a "light load" mode of operation.

Figure 4B:
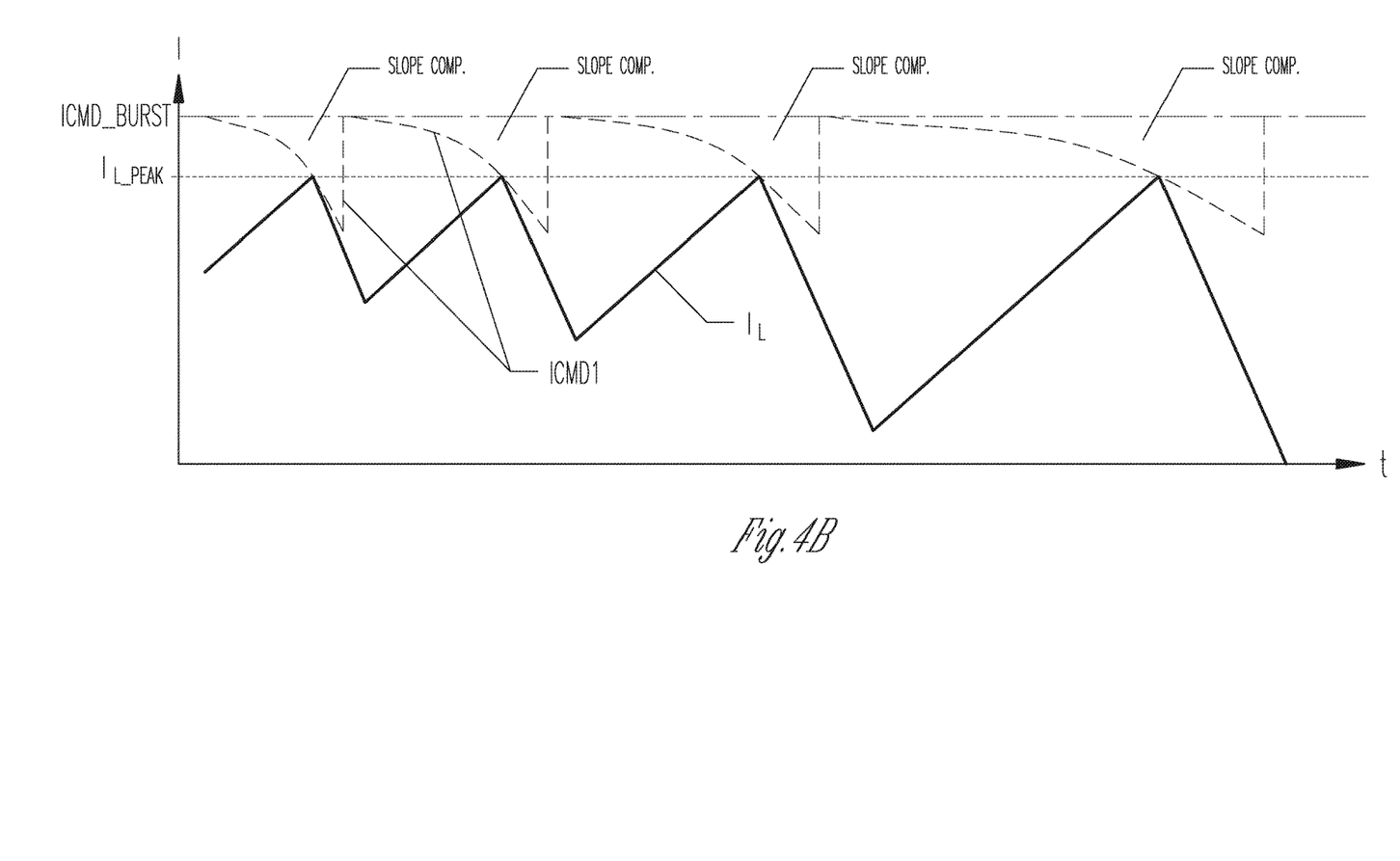
FIG. 4B illustrates graphically effects of modifying the slope compensation ramp signal in "light load" conditions.

FIG. 4B illustrates graphically effects of modifying the slope compensation ramp signal based on the oscillator period and includes the peak current command ($I_{CMD}$), the slope compensation ramp signal (Slope Comp.) offset by the peak current command ($I_{CMD}$) to form the peak current threshold ($I_{CMD1}$), and actual inductor current ($I_L$) of the power stage when the feedback signal is below the burst threshold ($V_{BURST}$). Although the peak current threshold ($I_{CMD1}$) can vary, when the feedback signal (FB) is below the burst threshold ($V_{BURST}$), the peak current threshold ($I_{CMD1}$) can operate to maintain the peak value ($I_{L\_PEAK}$) of the inductor current ($I_L$) of the power stage stable and at a nearly constant value. In certain examples, the peak current threshold ($I_{CMD1}$) can control the inductor peak current ($I_{L\_PEAK}$). The switching frequency ($f_{OSC}$) is modified based on the load current ($I_L$) and at the same time the slope compensation ramp signal (SLOPE COMP.) can also be modified proportionally. Modification of the peak current threshold ($I_{CMD1}$), via the slope compensation ramp signal (SLOPE COMP.) and constant peak command signal ($I_{CMD}=I_{CMD\_BURST}$) can operate to maintain the peak value ($I_{L\_PEAK}$) of the inductor ($I_L$) current of the power stage stable and at a nearly constant value when the feedback signal (FB) is below the burst threshold ($V_{BURST}$). As load current decreases, the switching frequency can be reduced, and, in turn, the inductor current valley can be reduced, and the average inductor current can be reduced to maintain the balanced current control.

Figure 5:
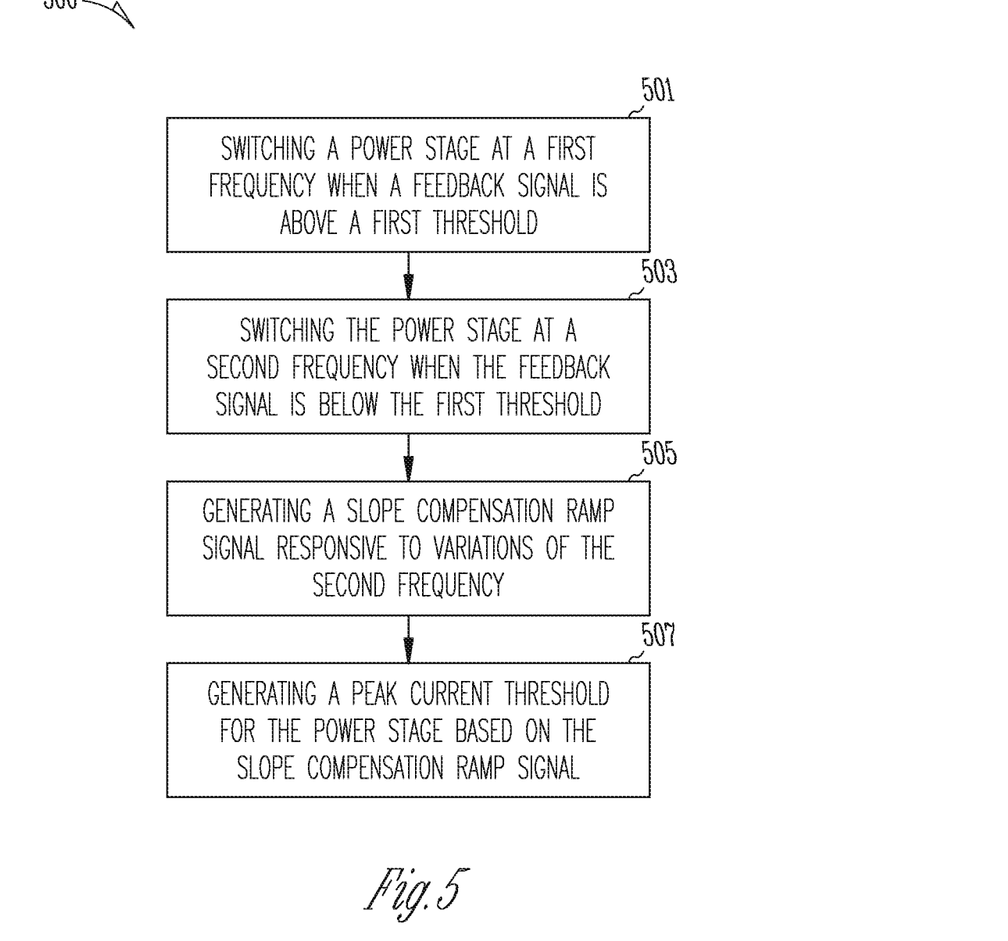
FIG. 5 illustrates generally an example method 500 for operating a DC-DC switching mode power supply circuit near and under light load conditions.

FIG. 5 illustrates generally an example method 500 for operating a DC-DC switching mode power supply circuit near and under light load conditions. At 501, when the current demand of the load is high, and a feedback signal is above a first threshold, a power stage of the DC-DC switching mode power supply circuit can perform a continuous switching mode and switch the at a static first switching frequency. In certain examples, the feedback signal can be indicative of a voltage error of the DC-DC switching mode power supply circuit. In some examples, the feedback signal is a representation of the voltage error integrated over an interval of time. At 503, when the current demand of the load decreases, and the feedback signal falls below the first threshold, a power stage of the DC-DC switching mode power supply circuit can continuously switch at a second switching frequency. The second switching frequency can be variable and can be based on a level of the feedback signal. In general, the second switching frequency is lower than the first frequency. At 505, a slope compensation ramp signal can be generated that depends on an oscillator ramp signal. The oscillator ramp signal can be used to provide a clock signal from an oscillator circuit to the power stage. At 507, the slope compensation ramp signal can be summed with a current command signal to provide a peak current threshold when the feedback signal falls below the first feedback signal. In certain examples, a continuous switching mode indicates that the oscillator operates continuously without injecting a delay or idle time to disable the oscillator.

In some examples, when the load decreases further and the feedback signal fall below a second threshold, a sleep command signal can be generated and various circuits of the DC-DC switching mode power supply circuit can be disabled to save power. The power stage of the DC-DC switching mode power supply circuit, a oscillator capacitor circuit, an oscillator charge current circuit, and a current setpoint circuit of DC-DC switching mode power supply circuit are examples of the various circuits that can be enable and disabled based on the sleep command signal.

Various Notes & Examples

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A switched-mode power delivery method of supplying current at a regulated voltage to a load, the method comprising:

in response to a representation including an integrated voltage error of the regulated voltage exceeds a first threshold, switching an inductive switching circuit at a first switching frequency in a first continuous switching mode, to supply the current to the load;

in response to the representation including the integrated voltage error being less than the first threshold indicating a light load condition, operating the inductive switching circuit in a second continuous switching mode to supply the current to the load, the second switching mode switching at a second switching frequency to supply the current to the load;

varying a ramp rate of a slope compensation ramp signal, responsive to varying of the second switching frequency during the second continuous switching mode; and controlling an inductor peak current based at least on the slope compensation ramp signal, and controlling the inductor peak current to switch the inductor switching circuit at a constant target peak current during the second continuous switching mode without a discontinuity in the target peak current in switching between the first continuous switching mode and the second continuous switching mode.

2. The method of claim 1, wherein at a range of load current during the second continuous switching mode, current through an inductor of the inductive switching current remains continuously positive.

3. The method of claim 2, wherein the ramp rate of the slope compensation ramp signal increases in response to an increase in the varying of the second switching frequency during the second continuous switching mode and decreases in response to a decrease in the varying of the second switching frequency during the second continuous switching mode.

4. The method of claim 2, wherein the ramp rate of the slope compensation is a substantially constant ratio to the varying second switching frequency during the second continuous switching mode for controlling the inductor peak current toward the constant target peak current.

5. The method of claim 2, wherein an inductor trough current varies responsive to the varying of the second switching frequency during a continuously positive inductor current operation in the second continuous switching mode.

6. The method of claim 2, wherein an inductor average current varies responsive to the varying of the second switching frequency during a continuously positive inductor current operation in the second continuous switching mode.

7. A switching regulator for supplying current at a regulated voltage to a load, said switching regulator comprising:
control circuitry configured to operate in a first continuous switching mode at a first switching frequency responsive to a first feedback signal exceeding a first threshold, to operate in a second continuous switching mode at a second switching frequency responsive to the first feedback signal being less than the first threshold indicating a light load condition, the first feedback signal including an integrated voltage error of the regulated voltage;
a power stage configured to receive a supply voltage and to provide the regulated voltage to the load, the power stage including an inductor and a switch circuit;
wherein the control circuitry is configured to:
vary a ramp rate of a slope compensation ramp signal responsive to varying of the second switching frequency during the second continuous switching mode;
control an inductor peak current based at least on the slope compensation ramp signal; and
control the inductor peak current to switch the inductor switching circuit at a constant target peak current during the second continuous switching mode without a discontinuity in the target peak current in switching between the first continuous switching mode and the second continuous switching mode.

8. The switching regulator of claim 7, wherein the control circuitry comprises:
a peak current command generator to generate an inductor peak current command responsive to the first feedback signal and the first threshold;
an oscillator to generate a clock signal, the clock signal having a clock signal frequency controlled responsive to the first feedback signal and the first threshold; and
a slope compensation ramp signal generator to generate the slope compensation signal, the ramp rate of the slope compensation ramp signal varying responsive to a varying of the oscillator frequency.

9. The control circuit of claim 8, comprising a summing node configured to control the inductor current based on a sum of the slope compensation ramp signal with the peak current command.

10. The control circuit of claim 9, wherein the clock signal frequency is equal to the second switching frequency in the second continuous switching mode.

11. The control circuit of claim 10, wherein the inductor current remains continuously positive over a range of load current in the second continuous switching mode.

12. The control circuit of claim 11, wherein:
in the first continuous switching mode, in which the first feedback signal is higher than the first threshold, the peak current command is controlled by the first feedback signal and the oscillator maintains a constant first switching frequency, with switching regulator output voltage being regulated by the peak current command against variation in the load current; and
in the second continuous switching mode, in which the first feedback signal is lower than the first threshold, the peak current command is controlled by the first threshold and the oscillator is controlled by the first feedback signal, with switching regulator output voltage being regulated by the second switching frequency against variation in the load current with the inductor peak current being maintained constant by the summing node.

13. The control circuit of claim 12, wherein the summing node is configured to control constant inductor peak current, and wherein the oscillator controls the inductor trough current by modulating the second switching frequency when the inductor current remains continuously positive in the second continuous switching mode.

14. The control circuit of claim 13, wherein the oscillator controls the inductor average current by controlling the inductor trough current in the second continuous switching mode.

15. The control circuit of claim 7, wherein the first feedback signal controls a first transistor control node and the first threshold controls a second transistor control node, a first conduction node of the first transistor being coupled to a first conduction node of the second transistor, a second conduction node of the first transistor coupled to a second conduction node of the second transistor and to a resistor to provide a current through the resistor as a peak current command.

16. The control circuit of claim 7, wherein the first feedback signal controls a first transistor control node and the first threshold controls a second transistor control node, a second conduction node of the first transistor coupled to a second conduction node of the second transistor, a first conduction node of the second transistor being connected to a reference node, a current of the first transistor configured to control the clock signal frequency.

17. A switching regulator for supplying current at a regulated voltage to a load, said switching regulator comprising:
means configured to operate in a first continuous switching mode responsive to a first feedback signal exceeding a first threshold and at a first switching frequency, to operate at a second switching frequency in a second continuous switching mode responsive to the first feedback signal falling below a first threshold, the first feedback signal including a representation of an integrated voltage error of the regulated voltage indicating a light load condition;
a power stage configured to receive a supply voltage and to provide the regulated voltage to the load, the power stage including an inductor and a switch circuit;
means for generating a slope compensation ramp signal responsive to the first and second switching frequency;
means for generating an inductor peak current threshold based at least on slope compensation ramp signal having a varying ramp rate responsive to varying of the second switching frequency during the second continuous switching mode;
and
wherein the a constant target peak current is maintained during the second continuous switching mode without a discontinuity in the target peak current switching between the first continuous switching mode and the second continuous switching mode.

18. The switching regulator of claim 17, including sleep mode means configured to enable and disable operation of an oscillator circuit of the switching regulator and means for operating the inductive switching circuit based on a comparison of the first feedback signal and second threshold.

19. The switching regulator of claim 17, comprising a summing node configured to sum the slope compensation ramp signal with the constant peak current command during the second continuous switching mode.

20. The switching regulator of claim 17, wherein the second switching frequency is continuous and is not formed using idle mode delays of an oscillator.

* * * * *